Jan. 5, 1937.  E. BENNETT  2,066,668
METHOD OF HEATING ELECTRICALLY CONDUCTING BODIES FOR INDUSTRIAL OPERATIONS
Filed June 19, 1931   2 Sheets-Sheet 1

Witnesses
Leslie P. Van Hagan
Royce P. Johnson

Inventor
Edward Bennett

Inventor
Edward Bennett

Patented Jan. 5, 1937

2,066,668

UNITED STATES PATENT OFFICE 2,066,668

METHOD OF HEATING ELECTRICALLY CONDUCTING BODIES FOR INDUSTRIAL OPERATIONS

Edward Bennett, Madison, Wis., assignor to Wisconsin Alumni Research Foundation, Madison, Wis., a corporation of Wisconsin Application June 19, 1931, Serial No. 545,568

4 Claims. (Cl. 219—11)

The invention herein described relates to improvements in electrical methods of heating to the desired temperatures those particular portions of conducting plates, or tubes, shapes, or bodies which are to undergo changes or to be operated upon. The feature of my invention is the method of confining or concentrating the heating current to the portions of the bodies in which the heating is desired, as for example, the edges along which a weld is to occur.

This is accomplished by using an alternating current of the necessary frequency, and so placing the two bodies to be welded relative to each other, and so connecting the source of current to the bodies that the current is confined to the portions of the bodies along which the weld is to be made. The object of my invention is to lessen the cost and improve the quality and uniformity of the welding and other operations by reason of the superior control of the heating operation which my method provides.

Figure 4:
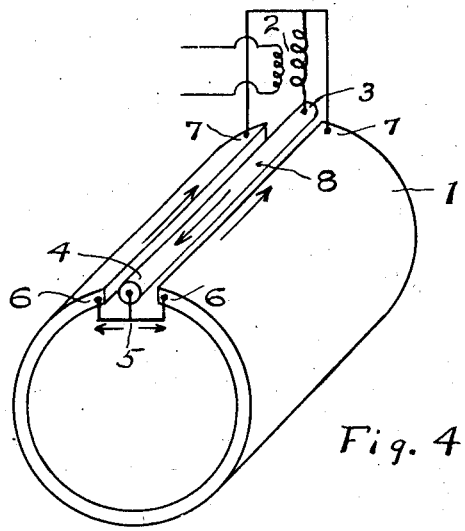
Figure 5:
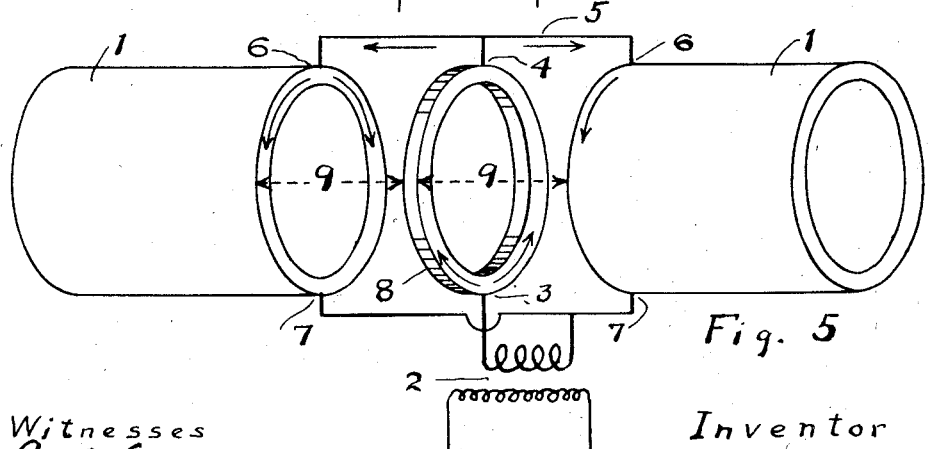
Figure 6:
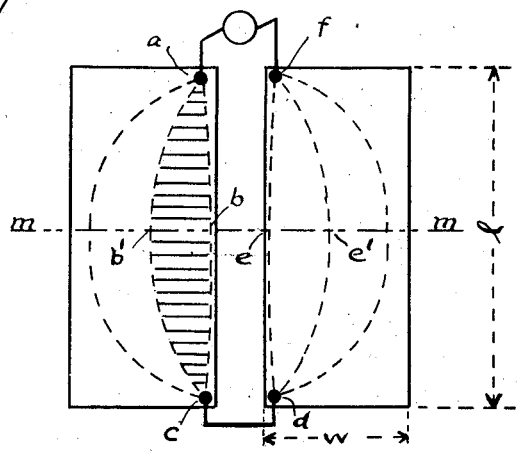

The manner in which my invention is applied is illustrated in the accompanying drawings forming part of these specifications. In these drawings, Figs. 1, 2, 3, 4, and 5 illustrate the electrical connections together with some of the shapes and their placement relative to each other, as used in the practice of my invention. Fig. 6 illustrates the principle involved in my invention and Fig. 7 indicates a transverse section taken on line $m$—$m$ of Fig. 6. In these figures an element which is common to the figures is designated by the same numeral in each diagram. The following description applies to these common elements.

The elements 1, 1 represent the plates, tubes or shapes which are to be heated to welding temperatures along those edges, strips, or portions of the shapes which are closely adjacent. These shapes must be conductors of electricity and they may be of the same material, for example two steel plates, or of different materials. The common element 2 represents a source of alternating current, or of oscillatory current, or of impulsive current. The primary source of the alternating current may be an electromagnetic generator, a thermionic generator or an arc generator, and the primary source will generally be connected to the shapes through a suitable transformer. The primary source of the oscillatory current and of the impulsive current may be the oscillating and the dead-beat discharge of condensers, respectively. In these cases also the primary source will generally be connected to the shapes through a suitable transformer. The two terminals of the source, or of the intervening transformer, are connected, or clamped to, or pressed against the bodies at adjacent points 3 and 7 near the edges to be welded as illustrated in the Figures 1 to 5. A closed path is provided, in which the heating current may flow, by connecting or clamping or pressing a conducting or "bridging" jumper 5 between adjacent points 4 and 6 at the other end of the edges to be welded. In those cases in which the two edges to be welded are part of a single shape as in Fig. 4 it is necessary during the heating operation to interpose between the edges to be heated an "auxiliary" conductor 8 connected as shown. This auxiliary conductor may be a water-cooled copper tube covered with thermal insulating material to keep it from cooling the heated edges. After the edges have reached the welding temperature, the auxiliary conductor is withdrawn. There are some advantages (described later) to be gained by using such an auxiliary conductor even in those cases in which its use is not absolutely essential. For example, an auxiliary conductor may be interposed between the edges or strips to be heated in Figs. 1, 2, and 3. Figure 5 is, in fact, Fig. 2 with the auxiliary conductor 8 interposed between the ends of the tubes which are to be heated.

For the sake of clearness in Figs. 1 to 5, it has been necessary to draw the parts 1, 1 to be welded with some considerable distance between the adjacent edges which at any given instant have currents flowing in the opposite directions indicated by the arrows. It should be understood, however, that in the practice of my invention, the gap 9 between adjacent edges is small,—of the order of a few millimeters or a few centimeters depending upon the thickness of the edges to be heated.

Figure 1:
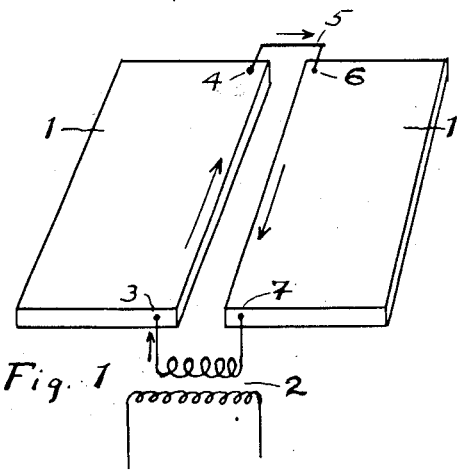
Figure 2:
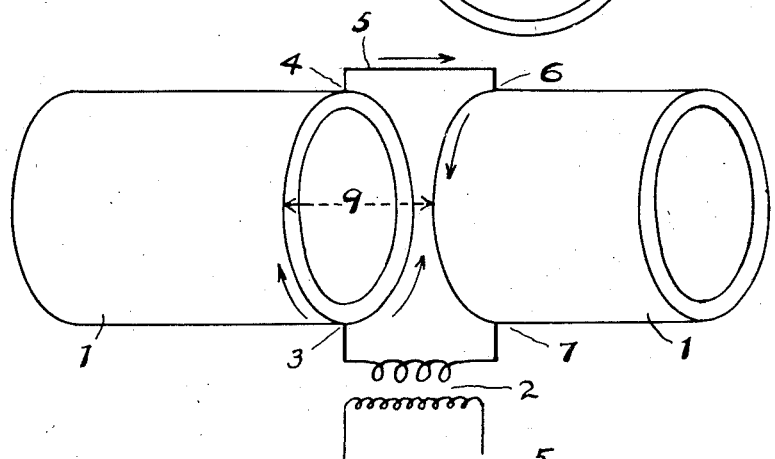
Figure 3:
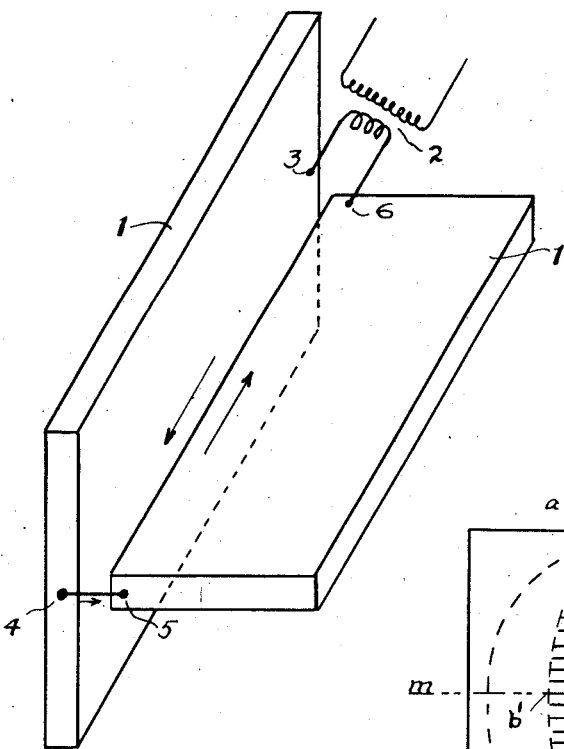

To now describe in more detail the special features of the illustrations 1 to 5. Fig. 1 shows the connections for the purpose of heating and welding two plates along the adjacent edges. With the connections shown, the current density is high in stream lines close to the adjacent edges and drops off rapidly as the stream lines are taken farther and farther from these edges. The result is that the high current densities in the stream lines close to the edges bring the adjacent edges to welding temperatures while the low current densities in the stream lines remote from the adjacent edges lead to an insignificant heating in these portions of the plate. Figure 2 shows the connections for heating and welding two tubes end to end. In the figure, the tubes have been drawn at some distance from each other, but it should be understood that during the heating operation the gap 9 between the ends of the pipes is of the order of a few millimeters. With these connections the current density is high close to the ends of the tubes and drops off rapidly in the stream lines more remote from the ends. Figure 3 shows the connections for heating the edge of one plate and an adjacent strip along the face of a second plate. Figure 4 shows the connections for heating to welding temperature the edges of a single plate which have been rolled into the form of a cylinder. In this case it is necessary to interpose an auxiliary conductor 8 between the edges to be heated and to pass the heating current through this auxiliary conductor in the manner shown. To avoid unnecessary losses in this auxiliary conductor, it should have as low a resistance as possible. It may be a water-cooled copper tube covered with thermal insulating material to prevent it from carrying off heat by radiation from the edges of the plate. After the edges of the plate reach welding temperature, the auxiliary conductor is withdrawn, before the edges are forged together. Figure 5 differs from Figure 2 in that Figure 5 shows the manner of connecting an auxiliary conductor 8 in the case in which the ends of two pipes are to be heated. Again the auxiliary conductor may be of copper and it may be water-cooled. In all of these operations after the edges have reached welding temperatures and before the edges are pressed or forged together, the heating current is shut off and the auxiliary conductor (if any) is withdrawn.

The underlying theory of my invention is as follows. Consider the electric circuit shown in Figs. 6 and 7. It consists of two plates, say of copper, to which a direct current generator is connected as shown. The approximate shapes of the current stream lines are indicated in the plan view of Fig. 6 by the dashed lines converging upon the electrodes at the ends of the plate. If the length $l$ of the plates is great as compared with their width $w$, the current density at the outer edges of the midsection $mm$ will be only slightly less than at the inner, or adjacent edges, and the joulean watt expenditure at the mid plane $mm$ will be almost as great at the outer edges as at the inner edge of the plate.

Figure 7:
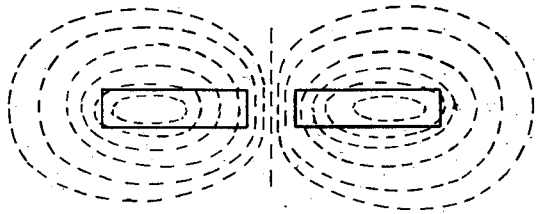

The distribution of the lines of magnetic flux density in a plane through the midsection $mm$ of Fig. 6 will be as illustrated by the dashed lines in the elevation of Fig. 7. From this it will be seen that the magnetic flux linkage of a stream-line filament, as $abcdefa$, on the inner edge is a minimum, and that the magnetic flux linkage of any stream line filament, $ab'cde'fa$, which is more remote from the inner edge, is greater than that of the first filament by twice the magnetic flux over the area $abcb'a$. With direct current supplied to the plates, the electromotive forces of resistance along the stream lines $abcdef$ and $ab'cde'f$ are each equal and opposite to the electromotive force impressed by the source between the terminals $a$ and $f$.

Let us now suppose that the current is caused to alternate and let us tentatively suppose that the distribution of the current densities remains as in the case of the direct current. If the current alternates, the electromotive force of resistance along the two stream lines will no longer equal the electromotive force impressed between $a$ and $f$ by the source, but in any filament it will be equal to the electromotive force which is impressed in common on all stream filaments diminished by the electromotive force $(e=-d\phi/dt)$ which is induced in that filament by the alternating flux. Since the flux linkage of the conductor filaments more remote from the inner edge is greater than the linkage of the nearer filaments, it follows that the electromotive force induced by changing flux will be greater in the more remote filaments, and as a consequence the electromotive force of resistance along the outer filaments must be far less than along the inner. From this it is seen that the current density must become less and less and must lag more and more in filaments farther and farther removed from the inner edge, and the higher the frequency the more rapidly will the current density drop off as the distances of the filaments from the inner edge increase. At the higher frequencies which I have used, namely oscillatory currents having a frequency of 30,000 cycles per second, the current is for all practical purposes confined to a film a few millimeters deep on the adjacent edges of the plates. The most satisfactory frequency to use depends upon many factors and economic considerations. In general it will be much lower than the frequency cited above, and much higher than the standard frequency of 60 cycles per second.

When an auxiliary conductor is interposed between the two edges in which the current is to be concentrated in the manner shown in Figs. 4 and 5, I find that the current density in the plates decreases more rapidly with distance from the edge than when the auxiliary conductor is not used. In other words, by the use of the auxiliary conductor, the desired concentration of the current in the edges can be obtained at a lower frequency of alternation than would otherwise be required. This effect is accounted for by the more effective distribution of the magnetic flux which is obtained by the use of the auxiliary conductor.

By the use of an auxiliary conductor or conductors an additional advantage is gained. The extent to which the heating current concentrates in the edge or the predetermined strip of the body to be heated is governed, or controlled, by the nearness of the auxiliary conductor to the strip to be heated. Moreover the proportion in which the current carried by the auxiliary conductor from the electrode 3 to the electrodes 6 divides between the two parallel return paths from 6 to 7 depends upon the relative distances of the auxiliary conductor from the two return paths. Consequently, if shapes of the same material but of different thicknesses, or if two shapes of different conductivity, are to be simultaneously brought up to the same or to different welding temperatures, this can be accomplished by suiting the spacing between the auxiliary conductor and the two shapes to the requirements of the case.

It will be seen from this description that the alternating current phenomena which I use in my invention is the shielding or screening effect of an alternating magnetic flux. In alternating current practice this is known as the "skin effect" and is thought of as a troublesome effect. My invention consists not alone in conceiving of a useful application for this otherwise objectionable effect, but in devising ways of arranging the shapes so as to enhance the effect to the degree necessary to produce a truly useful concentration of the heating current along the desired lines. My method of enhancing the effect is to place the edges to be heated close together, with or without an intervening auxiliary conductor, and by suitable electrical connections to cause the alternating currents to flow in opposite directions in the edges paralleling each other across the narrow air space separating the edges.

I have described my invention by showing how it is applied to a few shapes, but my invention is not limited in its application to the particular shapes used for illustration, neither is it limited to the case in which the edges or heated strips are to be welded together after the heating operation. The heating may be for any other useful purpose such as the purpose of upsetting, or forming, or annealing, or hardening, or even of melting the material along the heated strip.

Any selective electric heating operation by alternating, oscillatory or impulsive currents, in which the current is conducted by electrodes to the bodies to be selectively heated, and in which the current is prevented from dispersing over the entire conducting path from electrode to electrode, but is caused to concentrate to any desired degree in predetermined strips, by the expedient of so placing conductors relative to the predetermined strips and so placing the connecting electrodes, that each predetermined strip and the conductor separated from it by a narrow air (or other insulating) space carry the current in opposite directions, comes within the scope of my invention.

I claim as my invention and desire to secure by Letters Patent:

1. The herein described method of electrically heating a current conducting body in a narrow strip consisting in selecting the strip of said body to be heated, positioning another conductor in close proximity to said selected strip, and establishing in said strip and conductor varying current to said selected strip, and of sufficient adequate in combination with the degree of proximity of the strip and conductor to confine the current to said selected strip, and of sufficient intensity when so confined to heat said strip to the desired degree.

2. The method of selectively heating predetermined narrow strips at the edges of two electrically conducting bodies, which consists in placing the selected edges in parallel relation and in close proximity to each other, connecting a source of varying current to adjacent end points of said strips, electrically connecting together the other ends of said strips, whereby at each instant the direction of the current flowing in one edge is opposite to the direction of the current flowing in the other edge, said current being of a frequency sufficiently high in relation to the degree of proximity of said edges to concentrate the current density in said edges.

3. The method of heating a portion of an electrically conducting body along a desired narrow strip, which consists in connecting electrodes to the body at the ends of said strip, positioning an auxiliary conductor parallel to and in close proximity to the surface of said strip, connecting said auxiliary conductor in series with said body through the electrodes so that the current flows in opposite directions in said strip and auxiliary conductor, and impressing upon said series circuit a varying current of such frequency in relation to the proximity of the auxiliary conductor to the strip that the current is concentrated in said strip.

4. The method of heating a portion of an electrically conducting body along a desired narrow strip, which consists in connecting electrodes to the body at the ends of said strip, positioning an auxiliary conductor parallel to and in close proximity to the surface of said strip, connecting said auxiliary conductor in series with said body through the electrodes so that the current flows in opposite directions in said strip and auxiliary conductor, and impressing upon said circuit a varying current of such higher frequency than the usual industrial frequencies in relation to the degree of proximity of the auxiliary conductor to the strip that the electrical phenomena known as the proximity effect is utilized to concentrate the current in the strip.

EDWARD BENNETT.

CERTIFICATE OF CORRECTION.

Patent No. 2,066,668.    January 5, 1937.

EDWARD BENNETT.

It is hereby certified that error appears in the printed specification of the above numbered patent requiring correction as follows: Page 3, first column, line 38, claim 1, for the words "current to said selected strip, and of sufficient" read currents in opposite directions of a frequency; and that the said Letters Patent should be read with this correction therein that the same may conform to the record of the case in the Patent Office.

Signed and sealed this 23rd day of February, A. D. 1937.

(Seal)

Henry Van Arsdale
Acting Commissioner of Patents.